United States Patent [19]

Lott

[11] Patent Number: 4,734,932

[45] Date of Patent: Mar. 29, 1988

[54] TELEPHONE LOCAL INTERCOM SYSTEM

[76] Inventor: Thomas M. Lott, 55 W. Santa Inez, San Mateo, Calif. 94402

[21] Appl. No.: 911,898

[22] Filed: Sep. 25, 1986

[51] Int. Cl.[4] ..................... H04M 1/72; H04M 9/02
[52] U.S. Cl. .................................. 379/160; 379/64; 379/170
[58] Field of Search ............... 379/160, 66, 64, 65, 379/159, 165, 167, 170, 171, 172, 173

[56] References Cited

U.S. PATENT DOCUMENTS

| | | | |
|---|---|---|---|
| 4,475,193 | 10/1984 | Brown .................................... | 379/66 |
| 4,479,033 | 10/1984 | Brown et al. ......................... | 379/66 |
| 4,495,386 | 1/1985 | Brown et al. ......................... | 379/66 |
| 4,514,594 | 4/1985 | Brown et al. ......................... | 379/66 |
| 4,523,307 | 6/1985 | Brown et al. ......................... | 379/66 |

FOREIGN PATENT DOCUMENTS 0095761  6/1984  Japan .................................. 379/64

Primary Examiner—Michael J. Tokar
Assistant Examiner—Lawrence G. Fess
Attorney, Agent, or Firm—David B. Harrison

[57] ABSTRACT

Full duplex local intercom circuit arrangements are provided for telephone station instruments within a local network. Each instrument includes an FM receiver and an FM transmitter. If two subscriber telephone paths are provided, switches are also provided to reverse the connection of the paths of e.g. the calling party station relative to called party stations. The switches may be manual or automatic. If a single subscriber telephone path is provided, alternative carrier frequencies are selectively generated, with the calling party receive and transmit frequencies being reversed for the called party frequencies, either automatically, or manually. In all arrangements, the establishment of a normal telephone circuit through the central office over the subscriber line(s) has no effect on intercom communications, and vice versa.

27 Claims, 5 Drawing Figures

TELEPHONE LOCAL INTERCOM SYSTEM

Field of the Invention

The present invention relates to communications equipment. More particularly, the present invention relates to local intercom circuit arrangements preferrably for use with and between multiple, similarly configured telephone instruments interconnected via common subscriber circuit lines, for example.

BACKGROUND OF THE INVENTION

Local intercom circuits conventionally have been provided to enable multiple parties to signal each other and to communicate with each other without invoking any incoming line and its related central office line finger equipment. Such local intercom circuits have been provided typically as a functional feature of key telephone systems. Such systems are characterized by multiple incoming telephone lines and multiple user telephone station instruments being connected to the lines so that each instrument has key button access to each of the incoming lines. Such conventional intercom circuits, whether half-duplex or full duplex, have required centralized signalling and communication circuits and special local lines dedicated to the intercom function. These circuits have been expensive to make, install and operate.

More recently, complex digitized voice systems using the telephone line, and AM and FM local area carrier systems via primary power line distribution wiring, havve been employed. Although advances have occured in connection with the integration of FM communications circuits into small semiconductor packages, a need has heretofore remained unsolved for an improved full duplex telephone intercom system which may be configured to use existing local telephone circuit wiring without tying up incoming telephone line pairs from the central office, or requiring the installation of extra dedicated intercom pairs.

The hitherto unsolved need includes the provision of a fully self-contained, low cost intercom circuit within a telephone instrument which enables full duplex communication (i.e. simultaneous transmission and reception) without requiring any additional pairs of wire in the local cable. In situations where two or more pairs of wires are available locally for the telephone circuits, as with two or more line conventional key telephone systems, a hitherto unsolved need for a still more simplified and cost reduced intercom circuit arrangement for telephone systems without special intercom cabling has continued to exist.

SUMMARY OF THE INVENTION

A general object of the present invention is to provide local intercom circuit arrangements for use with and between multiple, similarly configured telephone instruments interconnected by common local cabling so as to overcome the drawbacks of, and advance the state of the prior art.

One specific object of the present invention is to provide a full duplex intercom arrangement by employing a dual frequency FM radio carrier talk circuit coupled to a single telephone system subscriber line (tip and ring wire pair, or optical path) using two carrier frequencies sufficiently separated spectrally as not to cause audible interference with each other, and as not to cause interference with the use of the lines for conventional telephone communications.

Another specific object of the present invention is to provide a full duplex intercom circuit arrangement by employing single frequency FM radio carrier talk circuits over two of the locally extending telephone company subscriber lines.

A further specific object of the present invention is to provide a full duplex intercom circuit arrangement with an frequency modulated carrier or carriers imposed locally on a telephone cable in a manner which does not cause any interference with telephone system signalling or central office equipment.

One more specific object of the present invention is to provide a full duplex intercom circuit arrangement which is easily operated, which is fully contained in a user telephone instrument, which requires very little power for operation, which may be manufactured and installed in the instrument at low cost, and which has a long and reliable useful life in the telephone environment.

In accordance with one aspect of the principles of the present nvention, an improved intercom circuit arrangement is provided for use with at least first and second telephone instruments connectable and operable within a local telephone network having a plurality of telephone subscriber line pairs extending between the telphone instruments, including a first telephone pair and a second telephone pair used to provide full duplex local talk path for a local intercom between the telephone instruments, without any mutual interference, and a plurality of intercom keys associated with the intercom circuit arrangement and with no separate paths dedicated to the full duplex intercom voice and signalling communications. In this aspect of the invention, the circuit arrangement includes integrally within the first instrument:

a frequency modulated receiver circuit with its audio output connectable to a handset receiver or loudspeaker of the first instrument and normally connectable to a preselected one of the first and second telephone pairs for receiving a carrier signal having a predetermined frequency preferably lying in a range between 100 and 400 kilohertz generated at the second instrument and frequency modulated by an audio signal generated by the handset or loudspeaking telephone microphone of the second instrument;

a frequency modulated transmitter circuit connected to a microphone of the first instrument and normally connectable to a preselected other one of the first and second telephone line pairs, the transmitter circuit for generating a carrier signal at the predetermined frequency which is frequency modulated by an audio signal generated by the microphone of the first instrument and which modulated carrier is applied to the preselected other one of the first and second telephone pairs; and, switching circuitry associated with the intercom keys for reversing the order of connection of the receiver circuit from the one pair to the other pair and the order of connection of the transmitter circuit from the other pair to the one pair.

In a second aspect of the present invention, the improved intercom circuit arrangement in the first instrument includes a frequency modulated receiver circuit of the type described which generates a control signal upon detection of the presence of an existing predetermined carrier signal on the preselected one of the first and second telephone pairs; a frequency modulated transmitter circuit of the type described; and wherein the switching circuitry automatically reverses the order of connection of the receiver circuit from the one to the other pair, and and for automatically reversing the order of connection of the transmitter circuit from the other to the one pair in response to the control signal.

In a third aspect of the present invention, the intercome circuit arrangement operates over a single telephone subscriber line in full duplex. The circuit arrangement in the first telephone instrument includes a frequency modulated receiver circuit of the type described capable of operating on one or the other of two pretuned frequencies and which generates a control signal upon detection of the presence of an existing carrier signal on the telephone pair; a frequency modulated transmitter circuit of the type described; and wherein the switching circuit at the first instrument changes the receiver circuit from the first frequency to the second frequency and changes the transmitter circuit from the second frequency to the first frequency.

In a fourth aspect of the present invention, the improved intercom circuit arrangement uses a single telephone subscriber line and provides a full duplex local intercom talk path between the telephone instruments. In this aspect, the circuit arrangement in the first instrument includes:

a first frequency modulated receiver circuit normally connectable to a handset receiver or a loudspeaker of the first instrument and to the telephone line for receiving a carrier signal having a predetermined first frequency;

a second frequency modulated receiver circuit selectably connectable to the handset receiver or a loudspeaker and to the telephone line for receiving a carrier signal having a predetermined second frequency different from the first, both predetermined frequencies preferably lying in a range between 100 and 400 kilohertz and generated at the second telephone instrument and frequency modulated by an audio signal generated by a handset microphone of the second telephone instrument;

at least one of the first and second receiver circuits being adapted to generate a control signal upon detection of the presence of an existing carrier signal on the intercom pair;

a first frequency modulated transmitter circuit normally connectable to a handset microphone of the first instrument and to the telphone line for generating a carrier signal having the predetermined second frequency;

a second frequency modulated transmitter circuit selectably connectable to the handset microphone and to the telephone line for generating a carrier signal having the predetermined first frequency, the generated carrier being frequency modulated by an audio signal generated at the microphone of the first instrument and which modulated carrier is applied to the telephone line; and a switching circuit for changing the selection of the first receiver circuit to the second receiver circuit and for changing the selection of the first transmitter circuit to the second transmitter circuit, in response to the presence of the control signal.

The foregoing circuit aspects may additionally include as a further aspect, all station voice page circuitry in each telephone instrument, including:

a page tone control generator circuit for generating and applying a supersonic, audio or subaudio page control audio tone of predetermined frequency to the transmitter circuit(s) of the first instrument;

a page tone detector connected to the audio output of the receiver circuit(s) for detecting the presence of a tone of the predetermined frequency in the aduio output thereof and for generating a page control signal;

an audio amplifier and loudspeaker connected to the receiver circuit(s) and controlled by the page control signal for reproducing modulated audio received by the receiver circiuts(s) when accompanied by the predetermined page control audio tone; and a page control audio tone band reject circuit connected between the receiver circuit(s) and the audio amplifier and loudspeaker means for rejecting the page control audio tone frequency.

In a further aspect of the present invention, the intercom circuit arrangement employs the telephone keypad and touch tone generator circuit normally included in the first telephone instrument for generating predetermined audio tone combinations in response to depression of each key of said key pad and for supplying the tones through a transmitter circuit(s) over the preselected telephone subscriber line to which the receiver circuit of the second telephone instrument is connected and further comprising a programmable touch tone decoder circuit connected to the receiver circuit(s) of the second instrument for receiving all of the touch tones received by the receiver circuit(s) and for generating a calling control signal in response to receipt of a preprogrammed touch tone; and, a ringer connected to the decoder circuit for locally annunciating a calling signal in response to the presence of the calling control signal. In this aspect, the receiver circuit(s) may additionally generate a decoder control signal upon detection of the presence of an existing predetermined carrier signal on the telephone line to which the receiver circuit(s) of the second instrument is connected, and a control gate for enabling operation of the touch tone decoder circuit in response to the decoder control signal. This control gate may switch power to the touch tone decoder circuit in order to conserve power during stand by conditions of the intercom circuit arrangement.

In yet another aspect of the present invention, the switching circuitry of the improved intercom circuit arrangement may include relay circuits controlled by the switch control signal. The relay circuits may include a field effect power transistor having a gate circuit connected to the control signal and having source and drain connections in series with a power supply and with field coils of the relays.

In yet another aspect of the present invention the characteristic of an FM system known as "the capture effect" gives a privacy characteristic to the communications since if in addition to the selected "called party" another party tries to come on the line, the "calling party" will immediately detect the situation and can request the unwanted third party to vacate the line.

These and other objects, advantages and features of the present invention will be more fully understood and appreciated by reference to the following detailed description of preferred embodiments presented in conjunction with the accompanying drawings.

DETAILED DESCRIPTION OF PREFERRED EMBODIMENTS

A telephone system conventionally includes a centralized switching facility (central office) 10 from which trunk lines 12 radiate to other switching points of the system. Concentrated at the central office 10 are local subscriber lines 14, four of which, 14a, 14b, 14c and 14d, are shown by way of example. Each local subscriber line (typically tip and ring wire) carries telephone battery potential and forms a full duplex talk path between a customer location, such as the office or residence 16 (enclosed by dashed lines in FIG. 1) and the central office 10. Each telephone subscriber line 14 terminates at a line finder position of the central office switching equipment. Repeaters may or may not be present in the path between the subscriber's location 16 and the central office, depending on distance therebetween.

The actual line-handling capacity of the central office at any one time is determined statistically, based on studies of subscriber traffic usage and calling patterns. Typically, there are many more incoming subscriber lines 14 than there are central office circuits available for the lines. Thus, it is most undesirable for users at a single subscriber location to invoke equipment of the central office 10 in order to carry forth local intercom communications, but this activity is known to occur. Such local intercom calls may tie up the central switching equipment and block access to the switching equipment by other subscribers, thereby preventing usage revenue from being realized by the telephone company.

Figure 1:
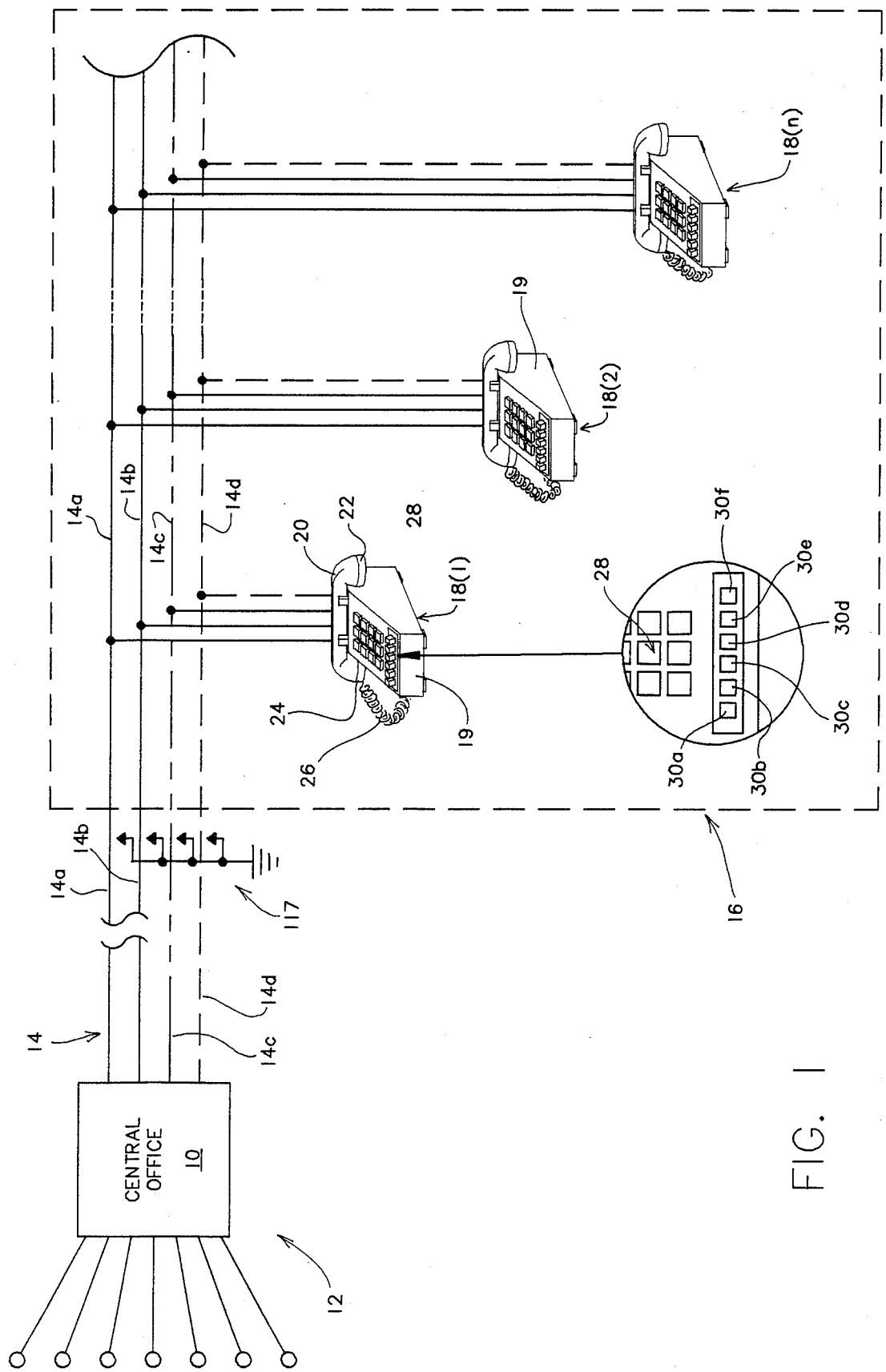
FIG. 1 is an overall environmental diagram illustrating a local telephone arrangement into which the intercom circuit arrangements of the present invention may be usefully incorporated.

As shown in FIG. 1, there are any number of local key telephone instrument stations 18(1), 18(2), ... 18(n) which may be commonly attached to the incoming lines 14a, 14b, 14c, 14d, etc. Three stations are shown by way of example, but the present system works well with up to e.g. twelve local key telephone instrument stations. Each station instrument 18 includes a molded plastic housinG 19, a handset 20, including a handset earphone 22 and a handset microphone 24, typically (but not necessarily) connected by a coiled wire cable 26 to the body 28 of the instrument 18. A touch tone generator pad 28 includes a matrix of 3 by 4 keys, each of which when depressed generates a dual frequency signalling tone to which the central office equipment may respond, and which may also be effectively employed for local signalling on the radio frequency (RF) intercom circuit path(s) as will be explained hereinafter.

In the enlarged circular inset in FIG. 1, a typical four-line key telephone instrument is shown, although instruments adapted to handle more or fewer than four lines may also include the presenT invention. Each instrument 18 also typically includes a row of keys 30, there being a key 30a for the "hold" function, e.g. four keys 30b, 30c, 30d, and 30e for selecting a telephone line from among up to four incoming telephone subscriber lines 14a, 14b etc., and at least one intercom key 30f which will be used for communications superimposed over at least one of the incoming subscriber lines. Two subscriber lines 14a and 14b may advantageously be utilized by several very low cost intercom circuit arrangements embodying the invention, to be described hereinafter.

While a typical key telephone instrument of the prior art is illustrated and described by the depicted instrument(s) 18, preferably, an electronic key telephone, such as the Hallicrafters TM self contained electronic key telephone system, model 412, distributed by the Hallicrafters Company, 969 A Industrial Road, San Carlos, Calif. 94070, is presently preferred as the telephone instrument 18, as more particularly described in the U.S. patent application Ser. No. 643,426, now U.S. Pat. No. 4,677,662 filed on Aug. 23, 1984, in the name of the present inventor. This particular key telephone instrument does not require a central key switching unit (KSU) and is fully self contained and has its own separate power supply.

Figure 2:
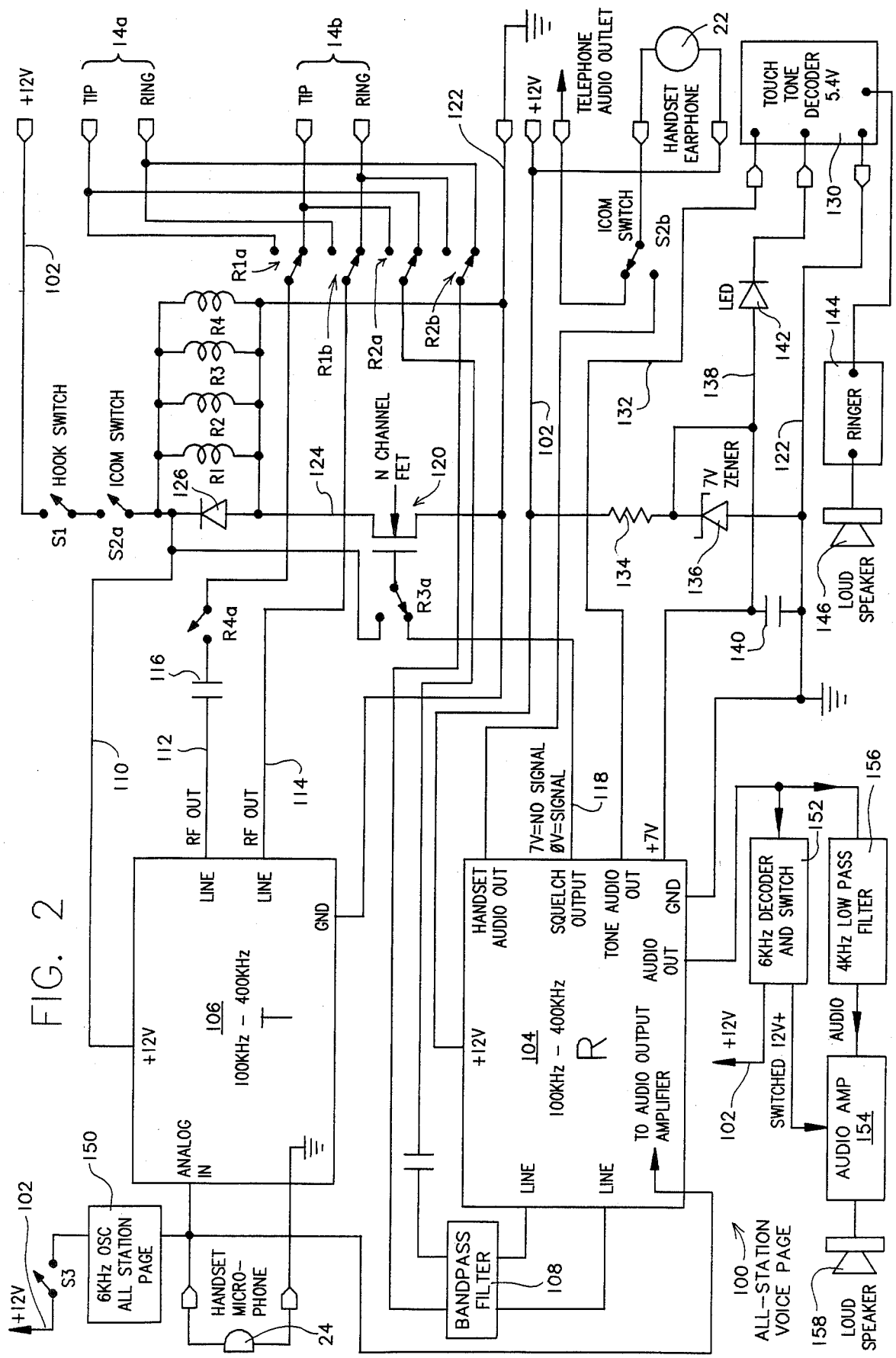
FIG. 2 is a block and schematic diagram of a telephone instrument including circuitry for the instrument in accordance with one preferred embodiment of the present invention.

A first preferred embodiment of one form of intercom circuit arrangement is depicted in FIG. 2. This embodiment is low cost and employs two local intercom talk paths, i.e. a path over the subscriber line 14a and a path over the subscriber line 14b. A circuit 100 for each one of the stations 18 making up this intercom circuit arrangement is preferably formed on and interconnected via a small printed circuit board (not shown) and thereafter included within the plastic housing 19 of the station instrument and connected to requisite elements of the instrument 18, as shown in FIG. 1.

The circuit 100 requires a suitable low voltage DC supply, such as 12 volts, and this voltage is provided on lines 102. The power is provided from a small power supply either associated with the instrument 18, or externally provided in connection with the circuit 100. Alternatively, the power supply may be provided by a battery located within the housing 19.

Essentially, the circuit 100 includes two major portions, an FM receiver 104 having an audio output connectable through switch contacts S2b of the intecom key 30f to the handset earphone 22, and an FM transmitter 106 having an audio input connected to the handset or a transmitter microphone 24.

The receiver 104 is preferably implemented as a single large scale integrated electronic circuit, such as type SL6601, made by Plessy Corporation, or equivalent. External components set the frequency of the receiver 104 to a predetermined first radio carrier center frequency preferably lying in a range between 100 KHz and to 400 KHz. A bandpass filter 108 resonant at the carrier center frequency of the first frequency adds further selectively and improves the sensitivity of the receiver 104.

The transmitter 106 is also preferably implemented as a single large scale integrated electronic circuit, such as with type CD4046 micropower phase locked loop, manufactured by RCS Corporation, or equivalent. The transmitter 106 generates a carrier with a center frequency at the predetermined first frequency to which the receiver 104 is responsive. The carrier is frequency modulated by audio from the handset microphone.

Each key telephone instrument 18 is conventionally provided with a hook switch S1 which closes whenever the handset 20 associated with the particular instrument 18 is removed from its cradle formed by the housing 19.

The intercom circuitry 100 depicted in FIG. 2 is activated by depressing the intercom key 30f which causes switch contacts S2a and S2b to close. Closure of S2a whenever the handset 20 is off hook (which also causes the contacts S1 to close), supplies the 12 volt power supply on the line 102 to the transmitter 106 at a circuit node 110. The transmitter 106 then employs the audio energy from the microphone 24 to frequency modulate a carrier having a predetermined carrier center frequency lying in a range between 100 and 400 KHz. This FM carrier signal is put out from the tranmitter 106 over lines 112 and 114. A DC blocking capacitor 116 permits RF to pass over the line 112 without simultaneously presenting a direct current path across the telephone line.

The frequency of the RF intercom carrier is sufficiently high so that unwanted RF signal levels are rapidly attenuated by the subscriber lines beyond the immediate premises 16 of the telephone service subscriber. Alternatively, suitable RF traps (not shown) may be provided at the lightning protector block location 117 where the subscriber lines 14 enter the subscriber's premises 16.

When the 12 volt potential reaches the node 110, a relay R4 is energized, and contacts R4a in the line 112 close, thereby sending the RF from the transmitter 106 to either the tip and ring wires of the first telephone pair 14a, or to the tip and ring wires of the second telephone pair 14b. This routing is determined by contacts of two relays R1 and R2 which may or may not be energized, depending upon whether the receiver 104 senses the presence of a carrier on the telephone pair 14a to which it is normally connected.

If a carrier from another local instrumenT 18 is not present on the telephone pair 14a when the user picks up the local handset of the first instrument shown in FIG. 2, thereby signifying that the user of the first instrument is the "calling party" over the intercom circuit arrangement, the receiver 104 genrates a 7 volt signal on a line 118. This signal is routed through contacts of a relay R3 to the base of an enhancement mode, N channel field effect transistor 120. This transistor 120 acts as a switch between a ground line 122 and a node 124 to which the field windings of the relays R1, R2 and R3 are connected. A switching transient suppression diode 126 across the nodes 110 and 124 protects the FET switch 120 from counter emf developed in the fields of the relays R1-3.

When the 7 volts on the line 118 is applied to the gate of the FET 120,it conducts and grounds the node 124, thereby causing the relays R1-3 to actuate, which reverses the order of connection of the transmitter 106 and receiver 104 relative to the telephone subscriber paths 14a and 14b, the receiver now being connected to the path 14b, by virtue of contacts R1a, R1b, R2a and R2b. This places the transmitter carrier on the same telephone path 14a to which all of the other receivers of the other instruments 18 are initially connected for monitoring. Any other receiver may now directly receive audio modulated carrier from the local transmitter 106 over this path. Likewise, the local receiver 104 is now monitoring the path 14b for a carrier signal from a transmitter of one of the other instruments 18. Thus, it will be appreciated by those skilled in the art that the calling party, i.e. the first local party topick up and key onto the intercom circuit arrangement, will have its transmitter and receiver connections reversed relative to the two telephone line pairs, by virtue of the switching action of the FET 120. All other stations 18 of the local intercom circuit arrangement which are not the first to invoke the intercom circuit and place a carrier on the path are thereby denominated "called parties".

At the same time, the contacts of relay R3 switch the base of the FET 120 from the receiver carrier control signal line 118 to the node 110. This action holds the switched sense of the contacts of R1 and R2 so long as the intercom key S2a and the hook switch S1 remain closed. Whenever either switch is opened, relay R3 opens, and the contacts R3a thereof return to the line 118 from the line 110.

A called party station instrument 18 including the circuit 100 of FIG. 2 detects the carrier signal from the callng party transmitter via the called party local receiver 104. When the carrier signal is present, the receiver 104 puts out a different voltage on the line 118, nominally zero volts. This different voltage on the line 118 is not sufficient to energize the FET 120, and so the relays R1-3 do not become energized and the original connection arrangements between the called party transmitter 106 and the called party receiver 104 remain connected as shown in FIG. 2 repsectively to telephone paths 14a and 14b.

Other highly useful features may be included as part of the circuit 100 depicted in FIG. 2. A conventional touch tone decoder chip 130 may be connected to a tone audio output of the receiver 104 over a line 132. A suitable regulated low power voltage may also be supplied through a resistor 134 connecting from the voltage bus 102 and zener diode 136 to the ground bus 122. A common line 138 supplies regulated low voltage to the touch tone decoder chip 130 and also to the receiver ship 104. A filter capacitor 140 smooths any transients appearing on the line 138. A light emitting diode indicator lamp 142 may be connected in series between the touch toner decoder 130 and the line 138.

An output from the decoder 130 may be supplied to a ringer circuit 144 which may include or be connected to an audio piezoelectric transducer or loudspeaker 146. The decoder 130 includes a small switch, such as a dual in line package (DIP) switch (not shown) by which one of the twelve commonly generated touch tones may be selected for decode and put out to the ringer 144. In this manner, the particular station instrument may be assigned a unique number within a field of 12, and only when a dual touch tone corresponding to this unique number is generated and transmitted by a calling party instrument transmitter 106 will it be decoded and will the ringer 144 of the called party cause an audio signal to be put out by the loudspeaker 146.

One other very useful feature which may be included in the intercom circuit arrangement is an all station voice page arrangement. This arrangement includes in each station instrument an audio tone oscillator 150 selectively activated by a push button switch S3 to supply a predetermined audio tone to the transmitter 106. A tone of e.g. 6 KHz works well. This tone, when generated by a calling party station, is then received by each receiver 104 at each called party station, and decoded by a decoder 152 at the selected called party station. The decoder 152 may take any suitable form.

As disclosed in FIG. 2, the decoder 152 responds to the presence of the all station voice page audio tone signal detected by the local receiver 104 and switches power to an audio amplifier 154. The amplifier 154 receives audio from the receiver 104 which audio is filtered by a 6 KHz band reject/low pass filter 156 to remove the 6 KHz tone. The remaining audio is used for paging by means of a small loudspeaker 158. When the all station voice page audio tone is present, the audio detected and put out by the local called party receiver 106 is amplified and presented over the loudspeaker 158 in the vicinity of the local called party station. In telephone instruments equipped with loudspeaking telephone circuitry, this circuitry may additionally be employed to provide the paging amplifier function. Since the calling party station is originating the tone, its receiver does not receive the tone, and the potential problem with audio positive feedback (squeal) is thereby avoided.

Figure 3:
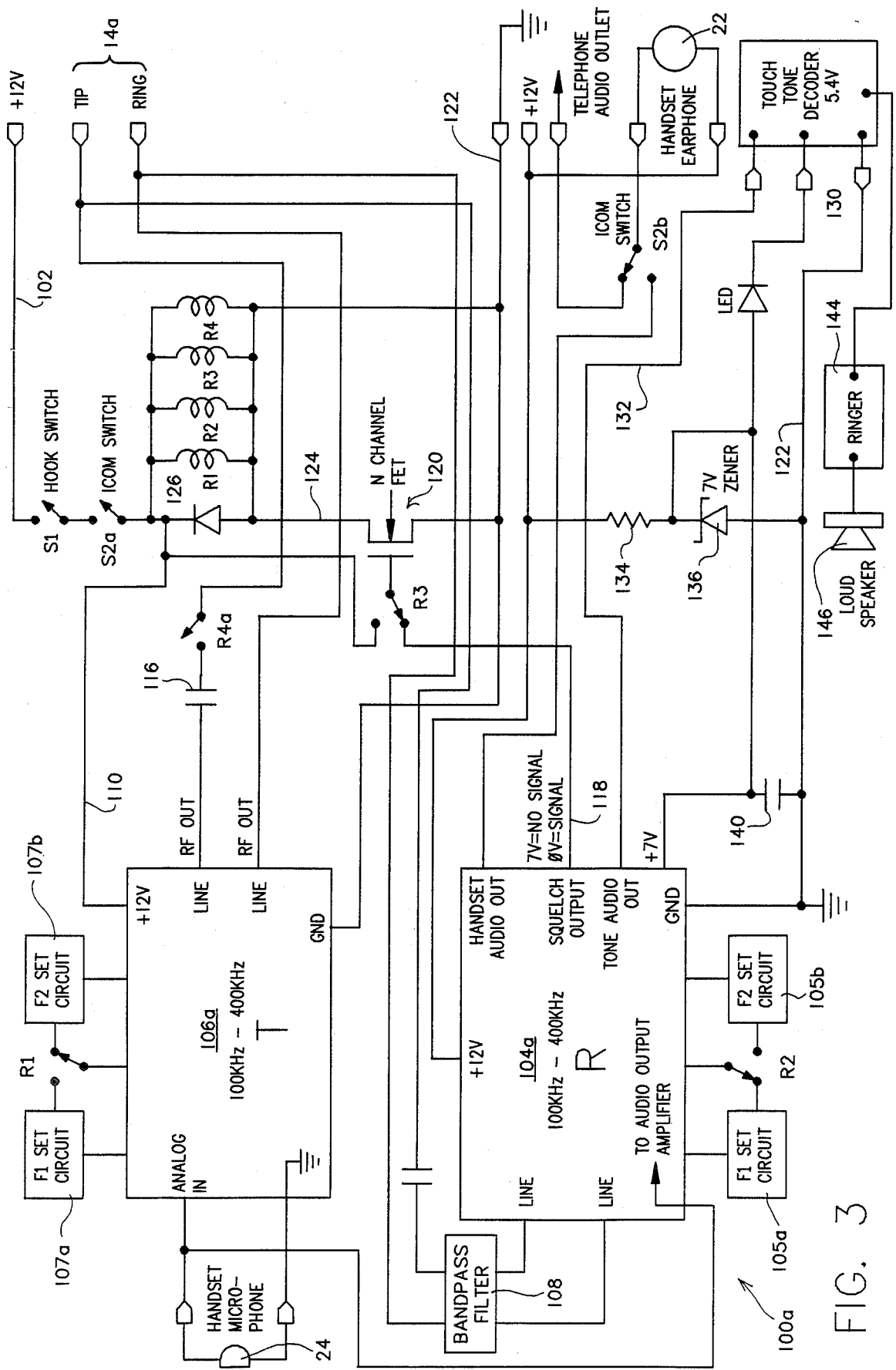
FIG. 3 is a block and schematic diagram of a telephone instrument including circuitry for the instrument in accordance with a second preferred embodiment of the present invention.

Referring now to FIG. 3, a second local intercom circuit arrangement for each station 18 is depicted as the circuit 100a. In this circuit, elements which are the same as the elements described in connection with the circuit 100 depicted in FIG. 2 bear the same reference numerals. The circuit 100a is very similar to the circuit 100. However, instead of requiring two separate telephone subscriber line paths 14a and 14b, only one path 14a is required and it is full duplex. Two predetermined frequencies F1 and F2, lying in the band between approximately 100 KHz and 400 KHz and sufficiently separated as not to create audio hetrodyne interference on the path 14a are generated and used. The calling party station 18 causes the relay contacts R1c to switch between frequency determining elements 107(b) (F2) ad 107(a) (F1) of the transmitter 106a and the relay contacts R2c to switch between frequency determining elements 105(a) (F1) and 105(b) (F2) of the receiver 104a. No such switching occurs at the called party station for the same reason as was already explained in connection with the circuit 100.

While separate frequency determining elements 107(a) and (b), and 105(a) and (b) are shown in FIG. 3, it will be appreciated that two separate IC transmitters and IC receivers may be substituted in place of the separate frequency determining elements, a pair of each being set to the F1 frequency, and the other pair being set to the F2 frequency.

The additional features described in connection with the circuit 100 are equally applicable and may be satisfactorily included with the circuit 100a in this intercom arrangement.

Figure 4:
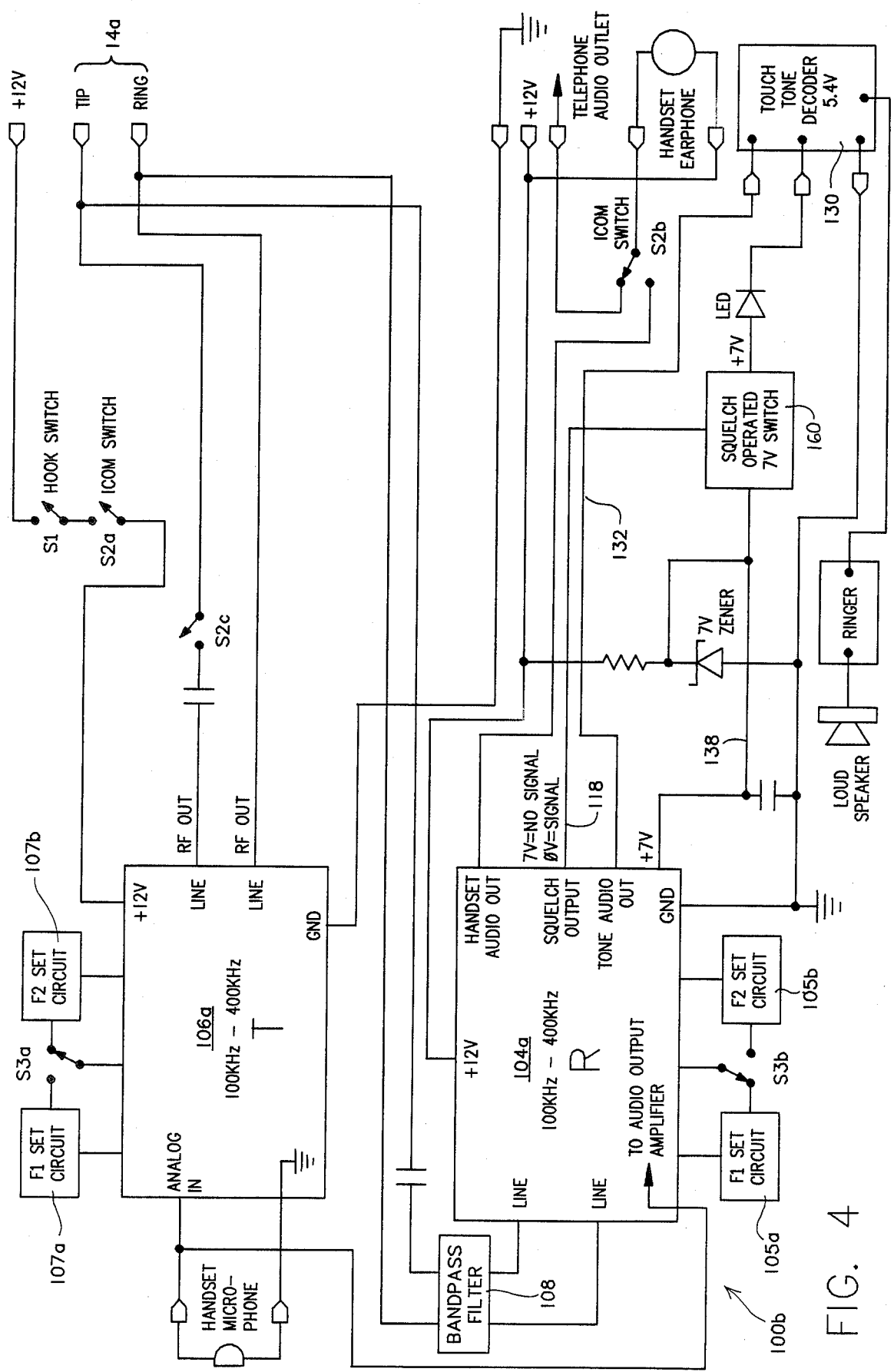
FIG. 4 is a block and schematic diagram of a telephone instrument including circuitry for the instrument in accordance with a third preferred embodiment of the present invention.
Figure 5:
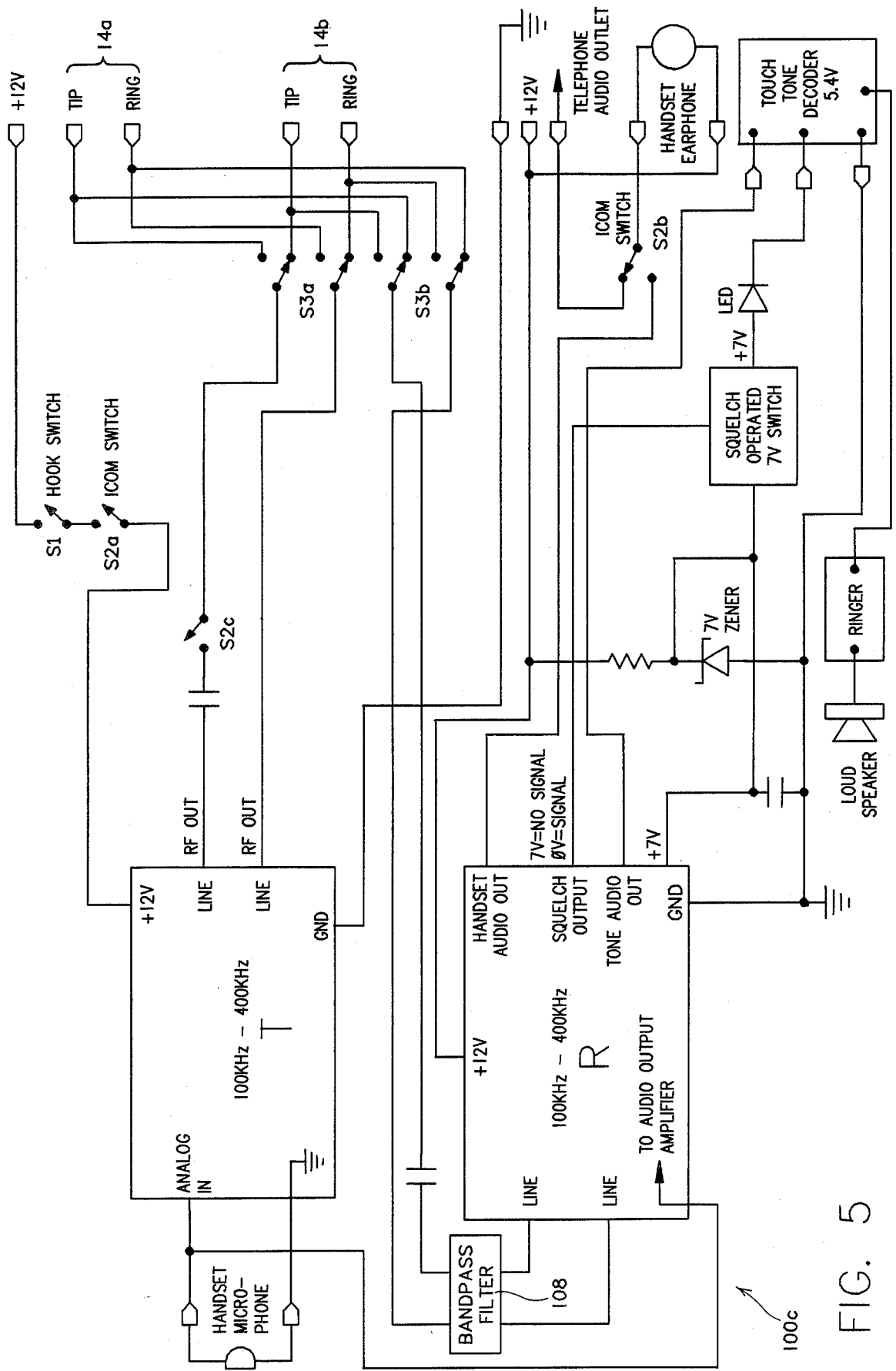
FIG. 5 is a block and sehcmatic diagram of a telephone instrument including circuitry for the instrument in accordance with a fourth preferred embodiment of the present invention.

FIGS. 4 and 5 depict even lower cost embodiments of circuits 100b and 100c, respectively, in which manually actuated switches replace the relays R1-4 and switching transistor 120. The FIG. 4 circuit 100b uses a single telephone subscriber linepath 14a, and the FIG. 5 circuit 100c requires two such paths 14a, 14b. These highly cost effective local intercom circuit arrrangements require two intercom key buttons, instead of one, a first button marked e.g. "intercom call" and operating contacts S3, and a second button marked e.g. "intercom receive" and operating contacts S2. The calling party station user initiates a call by pressing both key buttons thereby operating switch contacts S3 and S2 in order to switch the frequency determining elements F1 and F2 of the system (FIG. 4) or the telephone local paths 14a, 14b (FIG. 5). The called party station user only deepresses the key corresponding to the S2 contacts. To simplify operation, the key switches for S3 and S2 may be mechanically linked, so that when the S3 key is depressed, it automatically causes the S2 key also to become depressed, whereas when only the S2 key is depressed, the S3 kay remains unoperated.

If, at the end of an intercom conversation, the calling party forgets to release the S3 key button, that station will not revert to its normal standby configuration as a potential called party station, and it will not receive any incoming intercom calls. One solution to this situation is to provide for a flashing indicator or annunicator (e.g. a green LED) which operates so long as the S3 key is depressed. Another solution is to provide a mechanical linkage between the off-hook switch S1 and the S3 key, so that when the handset is returned to cradle ("on hook") the S3 key automatically releases.

A squelch operated switch (FET) 160 may be inserted in the line 138 leading from the receiver 104 to the touch tone decoder 130. This switch removes power from the touch tone decoder 130 until a carrier (incoming intercom call) is detected. This further reduces power consumption at the station instrument, an important consideration if the instrument is powered by a battery.

To those skilled in the art to which this invention pertains, many widely differing embodiments and arrangements will be suggested upon consideration of the foregoing. For example, the adaptation and use of one or the other of the single line embodiments of the present invention to provide full duplex communications over multi-station power line systems will be readily apparent to those skilled in the art. The description of presently preferred embodiments herein is by way of illustration only, and should not be considered to be limiting of the present invention, the scope of which is more particularly set forth by the following claims.

I claim:

1. An improved intercom circuit arrangement for use with at least a first and a second multiple key telephone instrument connectable and operable within a local telephone network havng a plurality of telephone subscriber lines extending between the said instruments including at least a first and a second telephone lines providing a full duplex local talk path for a local intercom between the said instruments, and a pair of keys associated with said intercom circuit arrangement, the circuit arrangement in the first said instrument comprising:

frequency modulated receiver means connectable to a handset receiver (or loudspeaker) of said first instrument and normally connectable to a determined one of said first and second telephone lines for receiving a radio carrier signal having a predetermined frequency generated at the second said instrument and frequency modulated by an audio signal generated by a handset or other microphone of the second said instrument, frequency modulated transmitter means connectable to a handset or other microphone of said first instrument and normally connectable to a determined other of said first and second telephone lines for generating a carrier signal at said predetermined frequency which is frequency modulated by an audio signal generated at said microphone of said first instrument and which modulated carrier is applied to said determined other of said first and second telephone lines, switching means associated with one of said pair of intercom keys for reversing the order of connection of said receiver means from said one line to said other line and the order of connection of said transmitter means from said other line to said one line.

2. The improved intercom circuit arrangement set forth in claim 1 further comprising all station voice page circuitry in said first instrument, said circuitry comprising:

page tone control generator means for generating and applying a page control audio tone of predetermined audio frequency tos aid transmitter means of said first instrument, page tone detector means connected to the audio output of said receiver means for detecting the presence of a tone of said predetermined audio frequency in the audio output thereof and for generating a page control signal, audio amplifier and loudspeaker means connected to said receiver means and controlled by said page control signal for reproducing modulated audio received by said receiver means when accompanied by said predetermined page control audio tone, and age control audio tone band reject circuit means betwen said receiver means and said audio amplifier and loudspeaker means.

3. The improved intercom circuit arrangement set forth in claim 1 wherein said instruments include keypad and touch tone generator means for generating predetermined audio tone combinations in response to depression of each key of said key pad and for supplying said tones through a said transmitter means over a telephone line to which said receiver of said first instrument is connected and further comprising programmable touch tone decoder means connected to said receiver means of said first instrument for receiving all of the touch tones received by said receiver means and for generating a callng control signal in response to decoding a preprogrammed touch tone, and ringer means for annunciating a calling signal in response to the presence of the calling control signal.

4. The improved intercom circuit arrangement set forth in claim 3 wherein said receiver means generates a control signal upon detection of the presence of an existing predetermined carrier signal on the telephone line to which the receiver means of the first instrument is connected, and control means for enabling operation of said touch tone decoder means in response to said control signal.

5. An improved intercom circit arrangement for use with at least a first and a second multiple key telephone instruments connectable and operable within a local telephone network having a plurality of telephone lines extending between the said instruments including a first telephone line and a second telephone line for providing a full duplex local talk path for a local intercom between the said instruments and a control key for connectng the instrument to the telephone lines, the circuit arrangement in the first said instrument comprising:

frequency modulated receiver means connectable to a handset receiver or loudspeaker of said first instrument and normally connectable to a determined one of said first and second telephone lines for receiving a radio carrier signal having a predetermined frequency generated at the second said instrument and frequency modulated by an audio signal generated by a handset microphone of the second said instrument, said receiver means for generating a control signal upon detection of the presence of an existing predetermined carrier signal on the said determined one of the first and second telephone lines, frequency modulated transmitter means connectable to a handset or other microphone of said first instrument and normally connectable to a determined other of said first and second telephone lines for generating a carrier signal at said predetermined frequency which is frequency modulated by an audio signal generated at said microphone of said first instrument and which modulated carrier is applied to said determined other of said first and secnd telephone lines, switching means for automatically reversing the order of connection of said receiver means from said one to said other line, and and for automatically reversing the order of connection of said transmitter means from said other to said one line in response to said control signal.

6. The improved intercom circuit arrangement set forth in claim 5 further comprising all station voice page circuitry in said first instrument, said circuitry comprising:

page tone control genertor means for generating and applying a page control audio tone of predetermined audio frequency to said transmitter means of said first instrument, page tone detector means connected to the audio output of said receiver means for deteCting the presence of a tone of said predetermined audio frequency in the audio output thereof and for generating a page control signal, audio amplifier and loudspeaker means connected to said receiver means and controlled by said page control signal for reproducing modulated audio received by said receiver means when accompanied by said predetermined page control audio tone, and page control audio tone band reject circuit means between said receiver means and said audio amplifier and loudspeaker means.

7. The improved intercom circuit arrangement set forth in claim 5 wherein said instruments include a keypad and touch tone generator means for generating predetermined audio tone combinations in response to depression of each key of said key pad and for supplying said tones through a said transmitter means over the telephone line to which said receiver of said first instrument is connected and further comprising programmable touch tone decoder means connected to said receiver means of said first instrument for receivng all of the touch tones received by said receiver means and for generating a calling control signal in response to decoding a preprogrammed touch tone, and ringer means for annunciating a calling signal in response to the presence of the calling control signal.

8. The improved intercom circuit arrangement set forth in claim 7 wherein said receiver means generates a control signal upon detection of the presence of an existing predetermined carrier signal on a telephone pair to which the receiver means of the first instrument is connected, and control means for enabling operation of said touch tone decoder means in respnonse to said control signal.

9. The improved intercom circuit arrangement set forth in claim 5 wherein said switching means includes relay means controlled by said control signal.

10. The improved intercom circuit arrangement set forth in claim 9 wherein said relay means includes a field effect power transistor having a gate circuit connected to said control signal and having source and drain connections in series with a power supply and with field coil means of said relay means.

11. An improved intercom circuit arrangement for use with at least a plurality of like configured telephone instruments connectable and operable within a local telephone network having at least one telephone subscriber line extending between the said instruments and to a central office facility of a telephone system and capable for use with a multiplicity of said instruments within said network without modification or adaptation of any said instrument therein, said arrangement for providing a full duplex local talk path for a local intercom between the said instruments connected within said arrangement and a control key for connecting an itercom circuit of the instrument to the telephone line, the itnercom circuit in the each of said instruments comprising:

frequency modulated receiver means connectable to a handset receiver or loudspeaker of a first of said instruments and to said telephone line for normally receiving a radio carrier signal having a predetermined first frequency and for selectably receiving a radio carrier signal having a predetermined second frequency different from the first and generated at a second of said instruments and frequency modulated by an audio signal generated by a handset or other microphone of the second said instrument, said receiver means for generating a control signal upon detection of the presence of an existing carrier signal on the said telephone line, frequency modulated transmitter means connectable to a handset or other microphone of said first instrument and to said telephone line for normally generating a carrier signal having said predetermined second frequency and for selectably generating a carrier signal having said predetermined first frequency, said generated carrier being frequency modulated by an audio signal generated at said microphone of said first instrument and which modulated carrier is applied to said telephone line, switching means at said instruments which is responsive to operation of said control key at an intercom call originating one of said instruments for changing the selection of said first to said second frequency of said receiver means and said second to said first frequency of said transmitter means and having override means responsive to the presence of said control signal at an intercom call receiving one of said instruments for inhibiting changing of the selection of said first and second frequencies at said receiver and transmitter means thereof.

12. The improved intercom circuit arrangement set forth in claim 11 further comprising all station voice page circuitry in said first instrument, said circuitry comprising:

page tone control generator means for generating and applying a page control audio tone of predetermined audio frequency to said transmitter means of said first instrument, page tone detector means connected to the audio output of said receiver means for detecting the presence of a tone of said predetermined audio frequency in the audio output thereof and for generating a page control signal, audio amplifier and loudspeaker means connected to said received means and controlled by said page control signal for reproducing modulated audio received by said receiver means when accompanied by said predetermined page control audio tone, and page control audio tone band reject circuit means between said receiver means and said audio amplifier and loudspeaker means.

13. The improved intercom circuit arrangement set forth in claim 11 wherein said instruments include a keypad and touch tone generator means for generating predetermined audio tone combinations in response to depression of each key of said key pad and for supplying said tones through a said transmitter means over the telephone line and further comprising programmable touch tone decoder means connected to said receiver means of said first instrument for receiving all of the touch tones received by said receiver means and for generating a calling control signal in response to decoding a preprogrammed touch tone, and ringer means for annunciating a calling signal in response to the presence of the calling control signal.

14. The improved intercom circuit arrangement set forth in claim 13 wherein said receiver means generates a control signal upon detection of the presence of an existing predetermined carrier signal on the telephone line, and control means for enabling operation of said touch tone decoder means in response to said control signal.

15. The improved intercom circuit arrangement set forth in claim 11 wherein said receiver means generates a control signal upon detection of the presence of an existing predetermined carrier signal on the telephone line and wherein said switching means includes relay means controlled by said control signal.

16. The improved intercom circuit arrangement set forth in claim 15 wherein said relay means includes a field effect power transistor having a gate circuit connected to said control signal and having source and drain connections in series with a power supply and with field coil means of said relay means.

17. An improved intercom circuit arrangement for use with first and second telephone instruments connectable and operable within a local telephone network having a telephone line extending between the said instruments for providing a full duplex local talk path for a local intercom between the said instruments, and a control key for connecting an intercom circuit of the instrument to the telephone line, the intercom circuit in the first said instrument comprising:

first frequency modulated receiver means normally connectable to a handset receiver or loudspeaker of said first instrument and to said telephone line for receiving a carrier signal having a predetermined first frequency and a second frequency modulated receiver means selectably connectble to the said handset receiver and to said telephone line for receiving a radio carrier signal having a predetermined second frequency different from the first and generated at the second said instrument and frequency modulated by an audio signal generated by a handset microphone of the second said instrument, at least one of said first and second receiver means for generating a control signal upon detection of the presence of an existing carrier signal on the said telephone line, first frequency modulated transmitter means normally connectable to a handset or other microphone of said first instrument and to said telephone line for generating a carrier signal having said predetermined second frequency and second frequency modulated transmitter means selectably connectable to the said handset or other microphone and to said telephone line for generating a carrier signal having said predetermined first frequency, said generated carrier being frequency modulated by an audio signal generated at said microphone of said first instrument and which modulated carrier is applied to said telephone line, switching means for changing the selection of said first receiver means to said second receiver means and for changing the selection of said first transmitter means to said second transmitter means, in response to said control signal.

18. The improved intercom circuit arrangement set forth in claim 17 further comprising all station voice page circuitry in said first instrument, said circuitry comprising:

page tone control generator means for generating and applying a page control audio tone of predetermined audio frequency to said transmitter means of said first instrument, page tone detector means connected to the audio output of said receiver means for detecting the presence of a tone of said predetermined audio frequencyin the audio output thereof and for generating a page control signal, audio amplifier and loudspeaker means connected to said receiver means and controlled by said page control signal for reproducing modulated audio received by said receiver means when accompanied by said predetermined page control audio tone, and page control audio tone band reject circuit means between aid receiver means and said audio amplifier and loudspeaker means.

19. The improved intercom circuit arrangement set forth in claim 17 wherein said instruments include a keypad and touch tone generator means for generating predetermined audio tone combinations in response to depression of each key of said key pad and for supplying said tones through a said transmitter means over the telephone line and further comprising programmable touch tone decoder means conencted to said receiver means of said first instrument for receiving all of the touch tones reeived by said receiver means and for generating a calling control signal in response to decoding a preprogrammed touch tone, and ringer means for annunciating a calling signal in response to the presence of the calling control signal.

20. The improved intercom circuit arrangement set forth in claim 17 wherein said receiver means generates a control signal upon detection of the presence of an existing predetermined carrier signal on a telephone pair to which the receiver means of the first instrument is connected, and control means for enabling operation of said touch tone decoder means in response to said control signal.

21. The improved intercom circuit arrangement set forth in claim 17 wherein said switching means includes relay means controlled by said control signal.

22. The improved intercom circuit arrangement set forth in claim 21 wherein said relay means includes a field effect power transistor having a gate circuit connected to said control signal and having source and drain connections in series with a powre supply and with field coil means of said relay means.

23. The improved intercom circuit arrangement set forth in claim 1 wherein said radio carrier signal has a predetermined center frequency lying in a range between 100 and 400 kilohertz.

24. The improved intercom circuit arrangement set forth in claim 5 wherien said radio carrier signal has a predetermined center frequency lying in a range between 100 and 400 kilohertz.

25. The improved intercom circuit arrangement set forth in claim 11 wherein said first and second predetermined frequencies lie in a range between 100 and 400 kilohertz.

26. The improved intercom circuit arrangement set forth in claim 17 wherein said first and second predetermined frequencies lie in a range between 100 and 400 kilohertz.

27. An improved intercom circuit arrangement for use with at least a plurality of like configured telephone instruments connectable and operable within a local telephone network having at least one telephone subscriber line extending between the said instruments and to a central office facility of a telephone system and capable for use with a multiplicity of said instruments within said network without modification for adaptation of any said instrument therein, said arrangement for providing a full duplex local talk path for a local intercom between the said instruments connected within said arrangement and a control key for connecting an intercom circuit of the instrument to the telephone line, the intercom circuit in each of said instruments comprising:

frequency modulated receiver means connectable to a handset receiver or loudspeaker of a first of said instruments and to said telephone line for normally receiving a radio carrier signal having a predetermined first frequency and for selectably receiving a radio carrier signal having a predetermined second frequency different from the first and generated at a second of said instruments and frequency modulated by an audio signal generated by a handset or other microphone of the second said instrument, said receiver means for generating a control signal upon detection of the presence of an existing carrier signal on the said telephone line, frequency modulated transmitter means connectable to a handset or other microphone or said first instrument and to said telephone line for normally generating a carrier signal having said predetermined second frequency and for selectably generating a carrier signal having said predetermined first frequency, said generated carrier being frequency modulated by an audio signal generated at said microphone of said first instrument and which modualted carrier is applied to said telephone line, switching means including a relay at said instruments which is responsive to operation of said control key at an intercom call originating one of said instruments for changing the selection of said first to said second frequency of said receivber means and said second to said first frequency of said transmitter means and having override means in series with a coil of said relay, said override means being responsive to the presence of said control signal at an intercom call receiving one of said instruments for thereby inhibiting operation of the relay, and wherein said override means comprises a field effect transistor in series with a coil of a relay having contacts for reversing selection of said first and second frequencies and having a gate element which is connected to receive said control signal, the presence of which causes current flow through said transistor to be cut off, thereby inhibiting changing of the selection of said first and second frequencies at said receiver and transmitter means thereof.

* * * * *

UNITED STATES PATENT AND TRADEMARK OFFICE
CERTIFICATE OF CORRECTION

PATENT NO. : 4,734,932

DATED : March 29, 1988

INVENTOR(S) : Thomas M. Lott

It is certified that error appears in the above-identified patent and that said Letters Patent is hereby corrected as shown below:

In the drawings, Sheet 2, Fig. 2, the connecting line shown below R4, should be removed as shown in the corrected portion below:

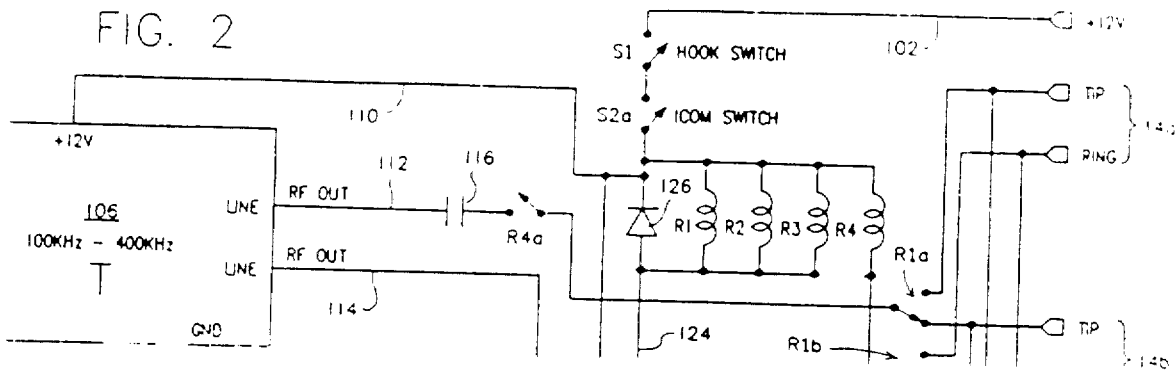

UNITED STATES PATENT AND TRADEMARK OFFICE
CERTIFICATE OF CORRECTION

PATENT NO. : 4,734,932

DATED : March 29, 1988

INVENTOR(S) : Thomas M. Lott

It is certified that error appears in the above-identified patent and that said Letters Patent is hereby corrected as shown below:

Column 1, line 33, replace "havve" with --have--;

Column 2, line 10, replace "an" with --a--;

Column 2, line 23, replace "nvention" with --invention--;

Column 2, line 28, replace "telphone" with --telephone--;

Column 3, line 6, after the word "and" delete "and";

Column 6, line 7, replace "presenT" with --present--;

Column 9, line 38, replace "ad" with --and--;

Column 11, line 16, replace "tos" with --to--;

Column 11, line 54, replace "circit" with --circuit--;

Column 12, line 4, after the word "means" delete "for";

Column 12, line 34, replace "deteCting" with --detecting--;

Column 13, line 22, replace "itercom" with --intercom--;

Column 15, line 32, add space between "frequencyin";

Signed and Sealed this

Eleventh Day of April, 1989

Attest:

DONALD J. QUIGG

Attesting Officer

Commissioner of Patents and Trademarks